United States Patent [19]

Shimada et al.

[11] 4,258,247
[45] Mar. 24, 1981

[54] METHOD OF PRODUCING WELDED JOINT INCLUDING NON-WELDED PORTION

[75] Inventors: Wataru Shimada; Susumu Hoshinouchi, both of Amagasaki, Japan

[73] Assignee: Mitsubishi Denki Kabushiki Kaisha, Tokyo, Japan

[21] Appl. No.: 964,447

[22] Filed: Nov. 28, 1978

Related U.S. Application Data

[62] Division of Ser. No. 759,124, Jan. 13, 1977, abandoned.

[30] Foreign Application Priority Data

Aug. 27, 1976 [JP] Japan .............................. 51-102784
Aug. 27, 1976 [JP] Japan .............................. 51-102787

[51] Int. Cl.³ .............................................. B23K 9/02
[52] U.S. Cl. .............................................. 219/137 R
[58] Field of Search .......... 219/137 R, 137 WM, 136, 219/121 R, 61, 121 LM, 121 EB

[56] References Cited

U.S. PATENT DOCUMENTS

| 1,630,037 | 5/1927 | Stresau | 219/61 |
| 1,950,393 | 3/1934 | Boardman | 219/137 R |
| 2,177,927 | 10/1939 | Hodge | 219/137 R |
| 3,165,619 | 1/1965 | Cohen | 219/121 EB |
| 3,679,862 | 7/1972 | Stoll et al. | 219/121 LM |

Primary Examiner—C. C. Shaw
Attorney, Agent, or Firm—Wenderoth, Lind & Ponack

[57] ABSTRACT

One metallic plate is set upright on another metallic plate and a filler fills each corner formed of both plates. A deposit metal is deposited on and adjacent to each filler to weld the plates to form a recess on that portion to the deposit metal facing a non-welded portion located between the welded plates. Alternatively the recess may be formed by supplying an inert gas to a space formed between the two plates and simultaneously depositing a deposit metal on the plates across the space.

7 Claims, 13 Drawing Figures

FIG. IA PRIOR ART
FIG. IB PRIOR ART
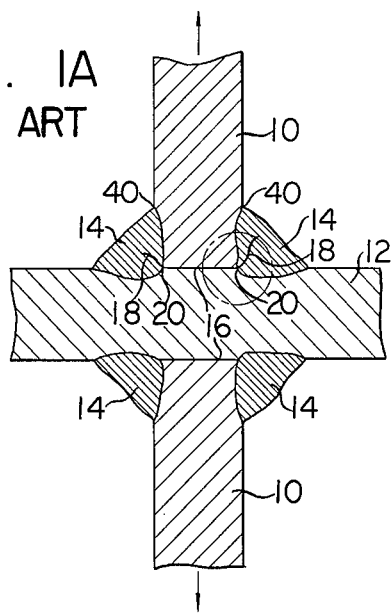
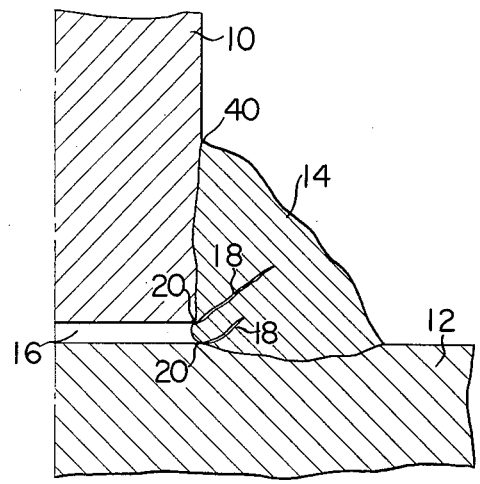
FIG. 2
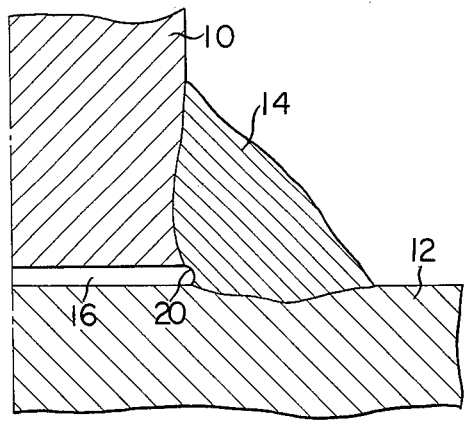
FIG. 4
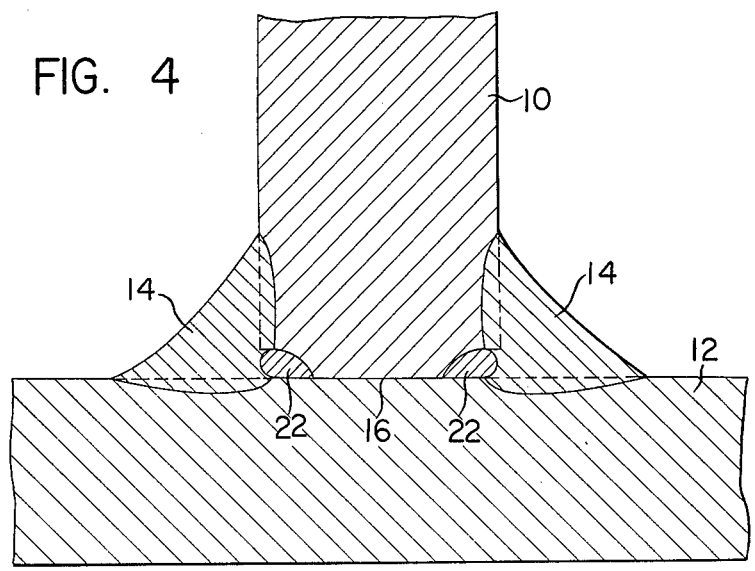

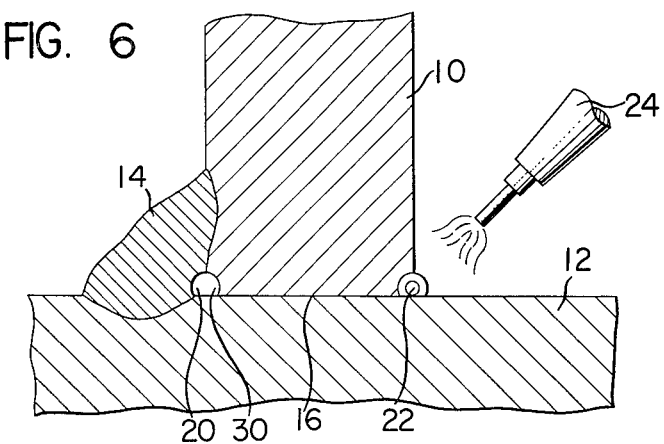
FIG. 6
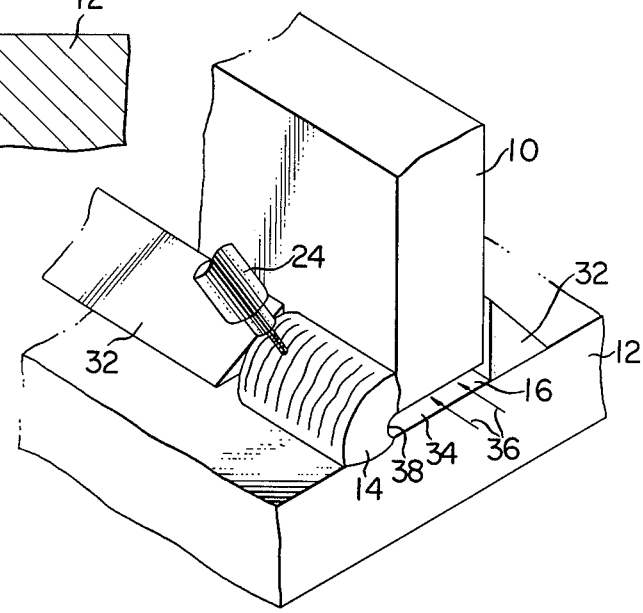
FIG. 7
FIG. 8
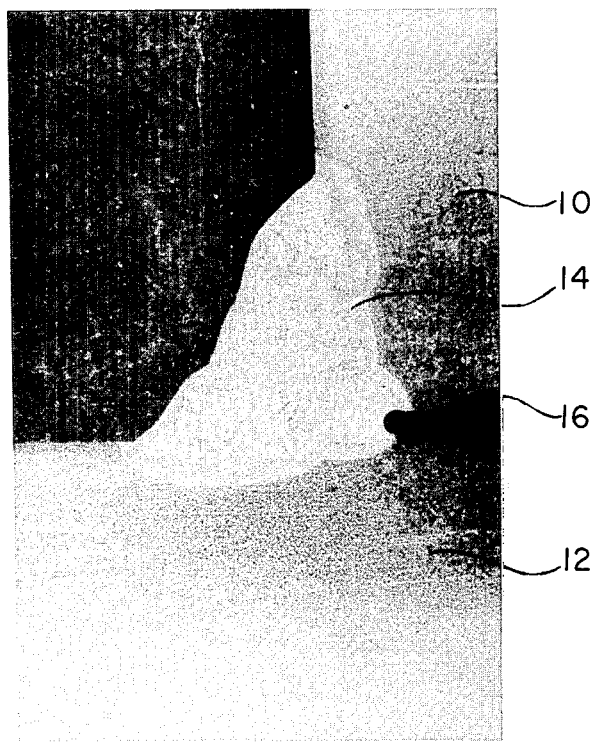

METHOD OF PRODUCING WELDED JOINT INCLUDING NON-WELDED PORTION

This is a division of application Ser. No. 759,124, filed Jan. 13, 1977, now abandoned.

BACKGROUND OF THE INVENTION

This invention relates to a method of producing welded joint including a non-welded portion, and more particularly to such a method of increasing strengths of the joint concerning the fatigue fracture and brittle fracture.

The term "joint" used herein and in the appended claims means a portion joining a member to another member.

In general, welded joints including the non-welded portion such as cross joints, T joints etc. are most frequently employed because of their convenience. However, it is well known that such welded joints have much lower fatigue strength than flat mother materials thereof. This has resulted in the restriction that those joints can not be employed in important constructions to which loads are repeatedly applied. The reasons for which welded joints including the non-welded portion are low in fatigue strength have been heretofore investigated by utilizing fracture mechanics. This low fatigue strength has been attributed to the fact that sharp notches are formed at the extremities of the non-welded portion and can be large enough to cause spontaneous sharp cracks such as fissures, fatigue cracks etc. Those sharp notches cause the concentration of high stress.

In order to increase the fatigue strength of those welded joints, it has been previously proposed to dispose the large groove on conventional joints to form welded joints with full penetration. This measure has been disadvantageous in that, with the welding desired to be effected in a narrow area, it is difficult to perform the welding operation. Also, even though the welding operation could be performed, the particular amount of deposit metal is redoubled, resulting in a great reduction in efficiency and/or occurrence of high welding distortion.

Accordingly it is an object of the present invention to decrease the concentration of stress on a root portion of a welded joint including a non-welded portion to increase its strengths concerning the fatigue fracture and brittle fracture.

It is another object of the present invention to substantially eliminate or minimize the disadvantages of conventional welded joints with the full penetration fillet including no non-welded portion; such as the redoubling of an amount of deposit metal and the occurrence of high welding distortion.

SUMMARY OF THE INVENTION

According to one aspect thereof, the present invention provides a method of producing a welded joint including a non-welded portion, comprising the steps of disposing a pair of metallic members to be welded to form an area therebetween providing a non-welded portion between the metallic members welded to each other, filling each of opposite extremities of the area with a filler, and thereafter effecting the fillet welding upon the filler to weld metallic members to each other to form a welded joint including the non-welded portion in the area.

Preferably the filler may be selected from the group consisting of slag forming materials, high melting-point materials such as molybdenum and tungsten not fused with a weldling arc, and copper in the form of a water cooled tube.

The slag forming material may be selected from the group consisting of coating compositions for the coated welding electrode, fluxes used with the submerged arc welding, backing fluxes used with the one side welding and glass tapes.

Advangageously, a holding element having the fillers held thereby at both ends may be sandwiched in the area between the metallic members so as to locate the fillers at both extremities of the area, respectively.

According to another aspect thereof, the present invention provides a method of producing a welded joint including a non-welded portion, comprising the steps of disposing a pair of metallic members to form a space therebetween providing a non-welded portion between the metallic members welded to each other, supplying a gaseous fluid to the space to establish and maintain therein a fluid pressure higher than the ambient pressure by a predetermined small magnitude and effecting the fillet welding to deposit a deposit metal on those portions of the metallic members adjacent to the opposite edges of the space to form a recess at the extremity of the space on that portion of the deposit metal facing the space.

The gaseous fluid may preferably be selected from the group consisting of inert gas, gaseous carbon dioxide, and mixtures thereof. If desired, oxygen may be added to the gaseous fluid.

BRIEF DESCRIPTION OF THE DRAWINGS

The present invention will become more readily apparent from the following detailed description taken in conjunction with the accompanying drawings in which:

FIG. 1A is a fragmental front elevational view of a cross joint that is typically a conventional welded joint;

FIG. 1B is a fragmental sectional view in an enlarged scale of that portion of the arrangement shown in FIG. 1A located in an area encircled by dots;

FIG. 2 is a view corresponding to FIG. 1B and is useful in explaining the principles of the present invention;

FIG. 4 is a view similar to FIG. 3A but illustrating another modification of the present invention using a slag forming material disposed in each of the small grooves formed between a pair of plate-shaped metallic members to be welded.

FIG. 6 is a view similar to FIG. 3A but illustrating a different modification of the present invention using a filler in the form of a copper tube cooled with water;

FIG. 7 is a fragmental perspective view of a T joint illustrated in the manufacturing step according to another aspect of the present invention wherein a gaseous pressure is maintained in a space formed between a pair of metallic members to be welded;

FIG. 8 is a microscopic photograph illustrating a section of a T joint produced according to the one aspect of the present invention;

Throughout the Figures like reference numerals designate the identical or corresponding components.

DESCRIPTION OF THE PREFERRED EMBODIMENTS

Figure 3A:
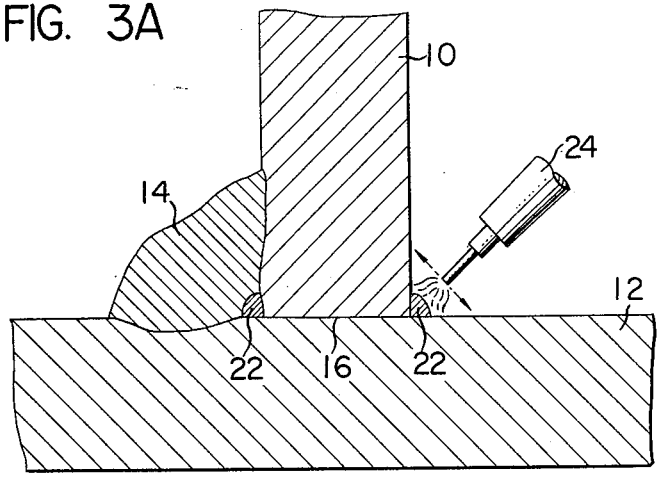
FIG. 3A is a fragmental sectional view of a T joint illustrating one aspect of the present invention using a filler formed of a slag forming material.

Referring now to FIG. 1A of the drawings, there is illustrated a cross joint that is typically a conventional welded joint including a non-welded portion. The arrangement illustrated comprises a pair of plate-shaped metallic members 10 abutting, in aligned relationship, another plate-shaped metallic member 12 into a cruciform cross section. The fillet welding technique was used to weld the metallic members 10 to metallic member 12 through a deposit on each of corner portions formed of the intersecting metallic members 10 and 12, while an interface between each member 10 and the member 12 welded to each other forms a non-welded portion 16.

When a load is repeatedly applied to the cross joint in the direction of the arrows shown in FIG. 1A, a fatigue crack or fissure 18 has or have been frequently caused starting with each extremity 20 of the individual non-welded portion 16.

Up to now, the fracture mechanics have been used to clear up the cause of the low fatigue strength exhibited by welded joints including the non-welded portion. FIG. 1B shows 20 an enlarged scale that portion of the cross joint as illustrated in FIG. 1A located in an area enclosed by a dotted circle shown in FIG. 1A. From FIG. 1B it is seen that sharp notches 18 from the extremity 20 of the non-welded portion 16 extend toward the exposed surface of the deposit metal 14. The sharp notches are comparable with spontaneous sharp cracks such as fissures, fatigue cracks etc. Thus it has been believed that the low fatigue strength of conventional welded joints including the non-welded portion can be attributed principally to the concentration of high stress on such a sharp notch.

The present invention contemplates the decrease the concentration of stress on the root of welded joints including the non-welded portion and increase of the fatigue strength and brittle fracture strength thereof by the provision of a recess disposed on that portion of the deposit metal 14 located at the extremity 20 of the non-welded portion 16 as shown in FIG. 2. The recess is preferably of a cross section as close to a semicircular cross section as possible.

Figure 3B:
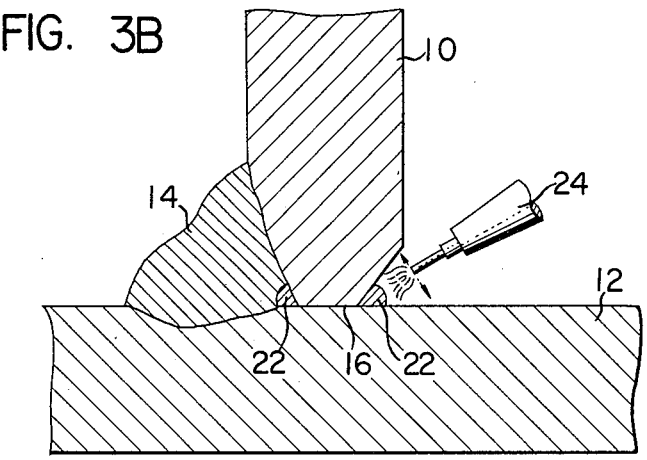
FIG. 3B is a view similar to FIG. 3A but illustrating a modification of the present invention shown in FIG. 1.

Referring now to FIG. 3, one aspect of the present invention is shown in FIG. 3A as being applied to a simple fillet welded joint and in FIG. 3B as being applied to a partial penetration fillet joint.

In FIG. 3A, a plate-shaped metallic member 10 is set upright on another plate-shaped metallic member 12 into a T cross section by having one end face thereof abutting against one surface of the metallic plate 12 and a slag forming member 22 having a quadrantal cross section is disposed to fill either of the corners formed of both metallic members 10 and 12, that is, on either of the fillet's roots.

The slag forming member 22 serves as a filler for establishing and maintaining a proper radius of a corresponding recess formed on the resulting deposit metal 14 at the extremity 20 of a mating non-welded portion 16 occupying an interface between both metallic members welded to each other. The slag forming member 22 is preferably formed of a material selected from the group consisting of coating compositions for welding electrodes used with the coated arc welding, fluxes used with the submerged arc welding, solid state fluxes used as patches for the one side arc welding, glass tapes etc. The slag forming member 22 is preferably so shaped that that portion of the cross sectional profile thereof not contacted by the metallic members 10 and 12 is defined by a circular arc. This is because, as above described, the resulting recess is preferably of a cross section as close to a semicircular cross section as possible. While the slag forming member 22 has a dimension as determined by the type of welding process involved and the particular welding current, the dimension thereof should have the necessary minimum magnitude required for ensuring a proper radius of a corresponding recess subsequently formed on the resulting deposit metal at each extremity of the non-welded portion without unnecessarily increasing the length of the non-welded portion. This radius of the recess is required to be of 0.5 mm. or larger as will be subsequently described.

Once the root of the metallic member 10 on both sides has been filled with the slag forming member 22, a welding torch 24 is used to effect the well known fillet welding on the slag forming member and on those portions of the metallic members 10 and 12 located adjacent thereto. During this fillet welding the slag forming member 22 is partly fused while bearing a deposit metal deposited thereon. Therefore, the deposit metal, after having been solidified, has a concave surface of quadrantal cross section on that portion thereof located at the extremity of the non-welded portion 16 as shown by a deposit metal 14 deposited on the lefthand side of the welded member 10 in FIG. 3A. That deposit metal 14 has been formed by repeating the process as above described. As a result, the root portion of the welded member 10 sharply decreases with respect to the concentration of stress thereon.

It has been found that, with satisfactory results, the radius of the recess formed on the deposit metal at each extremity of the non-welded portion after the fillet welding is at least 0.5 mm. and preferably ranges from 1.0 to 2.0 mm. The recess having a radius of less than 0.5 mm. cannot cause a decrease in the concentration of stress on the root portion of the welded member 10. On the contrary, if the radius of the recess is too large, the resulting deposit metal increases while an associated non-welded portion unnecessarily increases in length.

In FIG. 3B, the metallic member 10 is shown as including a notch on either side of its root portion.

Thus, V-shaped grooves are formed between the root portion of the metallic member 10 and the adjacent portion of the surface of the other member 12 on either side of the metallic member 10. Each of the V-shaped grooves is filled with a slag forming member 22 having a wedge-shaped cross section terminating at a circular arc. In other respects, the arrangement illustrated is substantially similar to that shown in FIG. 3A.

The arrangement illustrated in FIG. 4 is different from that shown in FIG. 3A only in that in FIG. 4 one of the metallic members 10 is provided on either side of the root thereof with a small groove. Then a slag forming member 22 fills substantially the entire volume of the small groove. The arrangement is advantageous in that a properly stabilized radius of the recess formed on that portion of the resulting deposit metal 14 located at each extremity of the non-welded portion 16 is ensured regardless of any variation in fusion depth.

Figure 5A:
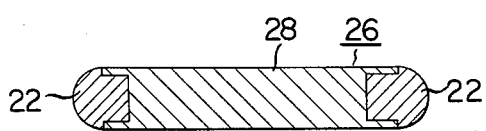
FIG. 5A is a sectional view of a holding element with a pair of fillers formed in accordance of the teachings of the present invention.

The method of the present invention can easily be carried out in the manner as shown in FIG. 5. As shown in FIG. 5A, a holding element 26 is first prepared including a holding member 28 of a suitable metallic material such as iron or copper provided on opposite ends with a pair of channels and a slag forming member 22 as a filler, snugly filled into each channel and terminating at a semicircular cylindrical surface. The holding member 28 may be, for example, 3 mm. thick and is substantially coextensive with the end face of that metallic member 10 to be underlaid therewith.

Figure 5B:
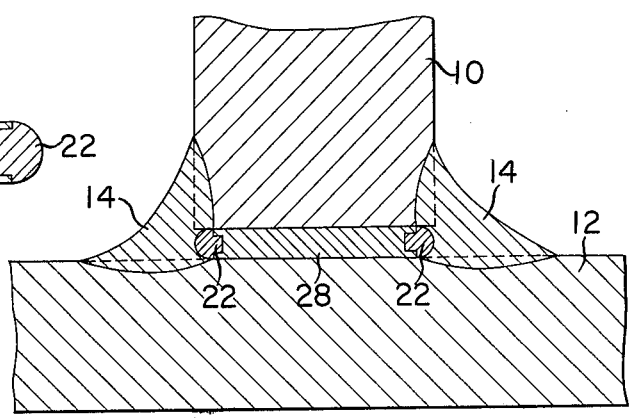
FIG. 5B is a view similar to FIG. 3A but illustrating still another modification of the present invention using the holding element of FIG. 5A inserted into a space providing a non-welded portion of the resulting welded joint.

As shown in FIG. 5B, the metallic member 10 is disposed on the other metallic member 12 through the holding element 26. Then, the fillet welding is effected as above described in conjunction with FIG. 3A.

The use of the holding element 26 extremely improves the workability and gives a similar result as that provided by each of the methods of the present invention as above described in conjunction with FIGS. 3 and 4.

It is to be noted that preferred examples of the slag forming member involve, in addition to the materials described in conjunction in with FIG. 3A, water cooled copper and high melting-point materials such as tungsten, molybdenum etc. not fused with the welding arc.

If the filler is to be formed of a material selected from the group consisting of water cooled copper and high melting-point materials such as tungsten, molybdenum etc. then the method of the present invention can be preferably carried out as shown in FIG. 6. In order to prevent the non-welded portion from unnecessarily increasing in length and/or to prevent a throat thickness from decreasing, the metallic member 10 is provided on either side of the root with a groove having a minimum dimension required for a mating filler 22 to be fitted into the groove and then the filler is disposed in the groove. The resulting assembly is shown on the righthand portion in FIG. 6. Thereafter, the fillet welding well known in the art is effected by using a welding torch 24.

The filler 22 shown in FIG. 6 has been composed of water cooled copper in the form of a water cooled copper tube having an outside diameter of 4 mm. and an inside diameter of 2 mm. The copper tube 22 is removed from the resulting weld to leave a space 30 facing a recess formed on that portion of the deposit metal 14 located at the extremity 20 of the non-welded portion 16 as shown on the lefthand side of the metallic member 10 in FIG. 6. In this way a T fillet joint has been produced.

The method of the present invention as shown in FIG. 6 requires additional time, although it would be slight, in order to form a groove on either side of the root of one metallic member but excellent over the use of a slag forming member in both the smoothness of configuration of that portion of the deposit metal located at each extremity of the non-welded portion and the uniformity of radius of the recess formed on said portion of the deposit metal.

According to the other form thereof, the present invention is carried out by having a gaseous fluid applied to a space formed between a pair of metallic members to maintain within the space a fluid pressure somewhat higher than the ambient pressure.

Referring now to FIG. 7 wherein the other form of the present invention is illustrated, one plate-shaped metallic member 10 is shown as being set upright on the other plate-shaped metallic member 12 so as to form a space 16 having, for example, a spacing of 3 mm. therebetween. To this end, a suitable spacer (not shown) 3 mm. high is interposed between both metallic members 10 and 12. The space is encircled by movable gas shields 32 disposed around the periphery thereof to be contacted by the adjacent portions of the surfaces of the metallic members 10 and 12 except for one side thereof forming a gas feed opening 34 through which a gaseous fluid is delivered to the space 16. After the completion of the fillet welding, the space 16 provides a non-welded portion 16 formed between the metallic members 10 and 12 welded to each other.

The purpose of the gaseous fluid is to establish and maintain a fluid pressure within the space 16 sufficient to prevent a deposit metal from pending within the space 16 from the upper wall thereof or the end face of the metallic member 10 during the fillet welding. The gaseous fluid may comprise an inert gas such as argon (Ar) or helium (He) or gaseous carbon dioxide ($CO_2$) with or without oxygen ($O_2$) or a mixture thereof. Preferred examples of the gaseous fluid involve pure argon, pure helium, pure gaseous carbon dioxide; 95% by volume of argon and 5% by volume of oxygen; 80% by volume of gaseous carbon dioxide and 20% by volume of oxygen; 10% by volume of argon, 70% by volume of gaseous carbon dioxide and 20% by volume of oxygen; and 10% by volume of argon and 90% by volume of gaseous carbon dioxide. In the mixture of argon, gaseous carbon dioxide and oxygen just specified, the proportion of argon to gaseous carbon dioxide may be varied at will.

After the space 16 has been encircled by the movable gas shields 32, a gaseous fluid such as above described is delivered to the space 16 through the opening 34 as shown at the arrow 36 in FIG. 7 to establish and maintain a fluid pressure within the space higher than the ambient pressure. For example, the space 16 is maintained at 1.02 atmospheres, assuming that the ambient pressure is of one atmosphere. In this way a small magnitude of an internal pressure is applied to the space 16. Following this a welding torch 24 is used to effect the fillet welding well known in the art while the gaseous fluid continues to be delivered to the space 16. As the fillet welding proceeds, that gas shield 32 disposed on that side of the metallic member 10 being welded is gradually moved away from the gas feed opeing 34 along the associated peripheral portion of the space 16. Since the internal pressure is applied to the space 16, the movement of the gas shield 32 results in the gaseous fluid within the space 16 externally gushing through that portion of the periphery of the space just clear of the gas shield 32. Upon fillet welding those portions of both metallic members 10 and 12 located around the gushing gaseous fluid, a deposit metal 14 deposited on such portions of both metallic members 10 and 12 has a recess 38 formed on that portion thereof deposited at the adjacent extremity of the resulting non-welded portion 16 to ensure a proper radius of the recess.

By continuing the fillet welding in this way, the deposit metal 14 is deposited on one side of the root portion of the metallic member 10 and the adjacent portion of the surface of the metallic member 12 along the mating edge of the space or the non-welded portion 16 and includes the recess 38 in the form of a substantially semicircularly cylindrical surface 38 extending along that edge of the non-welded portion 16.

As above described in conjunction with FIG. 3, the radius of that recess or void 36 is 0.5 mm. or more and preferably ranges from 1.0 to 2.0 mm. with satisfactory results. In the example illustrated the recess 38 will have a radius of 1.5 mm.

It is recalled that, with the radius of the recess less than 0.5 mm., the root portion of the welded member 10 can not reduce the concentration of stress thereon and, if the radius is too large, the amount of deposit metal increases and the non-welded portion unnecessarily increases in length.

FIG. 8 is a microscopic photograph illustrating a section of one portion of a weld formed according to the method of the present invention. The weld was formed by disposing one end face of a plate-shaped metallic member 10 on a surface of a separate plate-shaped metallic member 12 to form a spacing therebetween. The spacing was formed by interposing a glass tape including glass fibers woven to a thickness of 3 mm. between both metallic members 10 and 12 and filling either of the opposite extremities of the spacing with a similar glass tape of semicircular cross section. Then the assembly thus prepared was subject to fillet welding after which the glass tapes were removed from the resulting weld. As shown in FIG. 8, the deposit metal 14 has a recess of substantially semicircular cross section formed on that portion deposited at the extremity of the non-welded portion 16. The recess has a measured radium of 1.5 mm.

Therefore FIG. 8 definitely illustrates the effectiveness of the present invention.

In order to demonstrate the result of the present invention, fatigue tests using the pulsating tension load were conducted with cruciform fillet welded joints produced according to the method of the present invention and the prior art practice identical to the cruciform joint as shown in FIG. 1. The cruciform joints included the respective toe portions of the fillet (which are designated by the reference numeral 40 in FIG. 1) polish finished and then they were tested. This is because fatigue fractures are prevented from occurring on the toe portion of the fillet provided that the root portion increases in fatigue strength. Those fatigue fractures might occur on the fillet's toe portion in advance of the occurence of fatigue fractures on the fillet's root portion.

Figure 9:
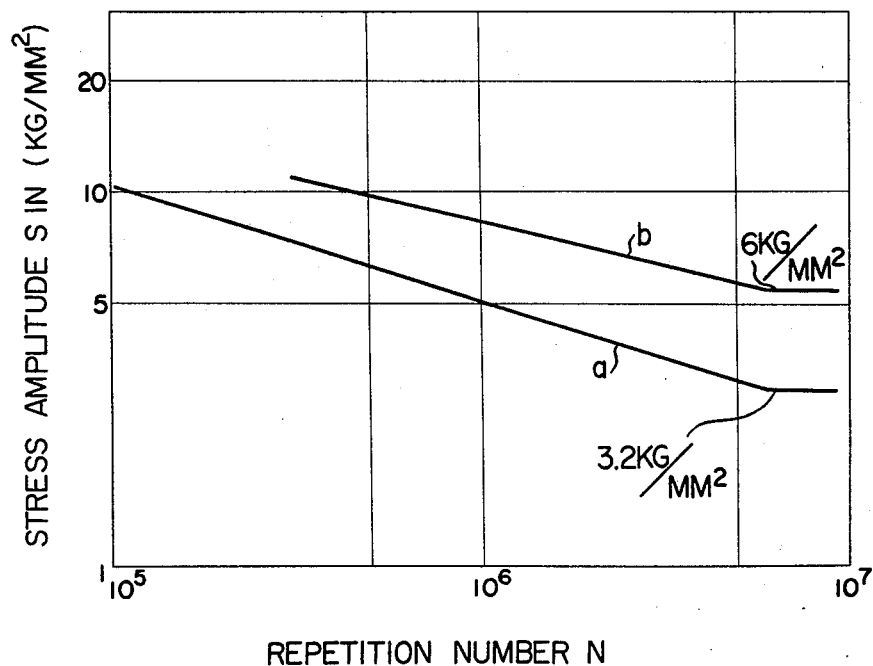
FIG. 9 shows fatigue strength curves for a cross joint produced according to the method of the present invention and a conventional cross joint.

In FIG. 9 wherein there is illustrated fatigue strength (S-N) curves, as the results of the tests, the axis of abscissas represents the number N of repeatedly applied stresses in a logarithmic scale and the axis of ordinates represents a stress amplitude S in a logarithmic scale. Curve a describes the cruciform joint produced according to coated arc welding technique by the prior art type processes utilizing no filler disposed on the root portion. On the other hand, curve b describes the cruciform joint produced according to the same technique by using the present invention utilizing, as a filler, a glass tape to increase the radius of the notch formed on the root portion.

From FIG. 9 it is seen that the conventional cruciform joint has a fatigue limit as low as about 3.2 $Kg/mm^2$ and the similar cruciform joint of the present invention has a fatigue limit of about 6 $Kg/mm^2$ nearly equal to twice the fatigue limit indicated by curve a. Therefore the present invention shows a distinct improvement. The low fatigue limit of the conventional cruciform joint is attributed to the high stress concentration on the extremity of each deposit metal.

It is to be understood that the present invention is also effective for increasing the strength concerning the brittle fracture for the reason similar to the reason for an increase in fatigue strength as above described.

Figure 10:
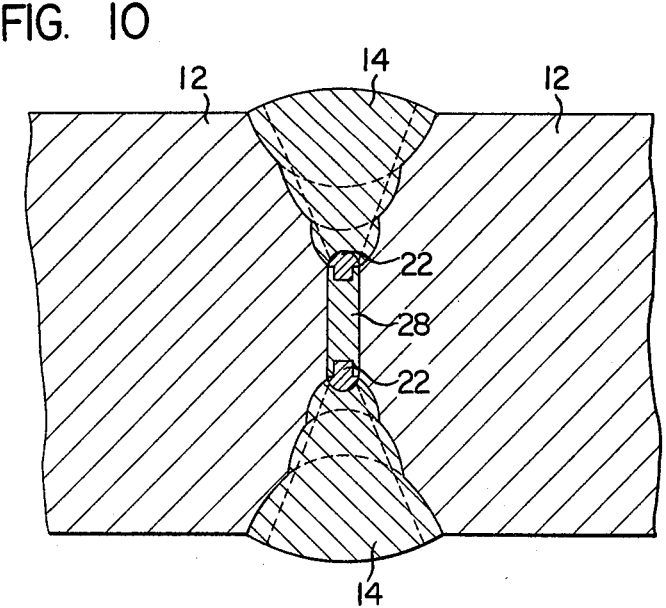
FIG. 10 is a fragmental sectional view illustrating the one aspect of the present invention applied to a butt joint.

While the present invention has been illustrated and described in conjunction with several preferred embodiments thereof applied to fillet welded joints it is to be understood that the same is equally applicable to butt joints or other joints. For example, FIG. 10 shows another embodiment of the present invention applied to a butt joint. As shown in FIG. 10, a pair of plate-shaped metallic members 10 and 12 are disposed in opposite relationship by having the adjacent end faces abutting each other through a holding element 26 similar to that shown in FIG. 5A and interposed therebetween. A pair of opposite V-shaped grooves are formed on and under the holding element 26 between both metallic members 10 and 12 to be filled with deposit metals 14 as in the previous embodiments of the present invention.

What we claim is:

1. A method of producing a welded joint including a non-welded portion which comprises inserting a holding element in an area between a pair of metallic members to be welded to each other, said holding element containing a filler held at each end thereof such that the fillers are located at two root portions of the metallic members which face each other, said fillers extending outward from the holding element at both ends thereof so as to form filler-containing recesses in the metal to be deposited on the fillers in a subsequent welding step, effecting a welding by depositing a metal upon the fillers at the root portions of said metallic members so as to weld the metallic members together, said welded joint thus constituting an area containing a welded and a non-welded portion, said fillers forming recesses in the metal deposited on the root portions of the metallic members.

2. A method of producing a welded joint including a non-welded portion as claimed in claim 1 wherein said filler is composed of a high melting-point material which is not fused by the welding operation.

3. A method of producing a welded joint including a non-welded portion as claimed in claim 2 wherein said high melting-point material is selected from the group consisting of molybdenum and tungsten.

4. A method of producing a welded joint including a non-welded portion as claimed in claim 1 wherein said recesses each have a radius of at least 0.5 mm.

5. A method of producing a welded joint including a non-welded portion as claimed in claim 1 wherein said holding element is disposed in said area between the pair of metallic members so as to locate said fillers at both extremities of said area, respectively.

6. A method of producing a welded joint including a non-welded portion as claimed in claim 1 wherein a pair of opposite grooves are formed between a root portion of one of said metallic members and the adjacent portion of the other metallic member and said holding element is disposed in said area so as to locate said fillers held thereby at both extremities thereof.

7. A method of producing a welded joint, including a non-welded portion which comprises inserting a water-cooled copper tube in an area between a pair of metallic members to be welded to each other, such that the ends of the copper tubing serve as fillers and are located at the two root portions of the metallic members which face each other, said copper tubing fillers extending outward from said metallic members at both ends thereof so as to form filler-containing recesses in the metal to be deposited on the fillers in a subsequent welding step, effecting a fillet welding by depositing a metal upon the fillers at the root portion of said metallic members so as to weld the metallic members together, said welded joint thus constituting an area containing a welded and a non-welded portion, said fillers forming recesses in the metal deposited on the root portions of the metallic members.

* * * * *